(12) United States Patent
Hsiao

(10) Patent No.: US 7,646,449 B2
(45) Date of Patent: Jan. 12, 2010

(54) BACKLIGHT MODULE AND LIQUID CRYSTAL DISPLAY USING SAME

(75) Inventor: Chih-chung Hsiao, Miao-Li (TW)

(73) Assignee: Innolux Display Corp., Miao-Li County (TW)

( * ) Notice: Subject to any disclaimer, the term of this patent is extended or adjusted under 35 U.S.C. 154(b) by 40 days.

(21) Appl. No.: 12/004,829

(22) Filed: Dec. 21, 2007

(65) Prior Publication Data

US 2008/0151140 A1     Jun. 26, 2008

(30) Foreign Application Priority Data

Dec. 22, 2006   (CN) .................... 2006 1 0157899

(51) Int. Cl.
*G02F 1/1335* (2006.01)
*G02B 6/26* (2006.01)
*F21V 7/04* (2006.01)
*F21V 5/00* (2006.01)

(52) U.S. Cl. ............................. 349/68; 349/62; 349/64; 349/65; 385/27; 385/39; 385/901; 362/246; 362/607; 362/613

(58) Field of Classification Search ................... 349/62, 349/64–65, 68; 385/27, 39, 901; 362/246, 362/607, 613
See application file for complete search history.

(56) References Cited

U.S. PATENT DOCUMENTS 7,036,956 B1    5/2006   Chou
2006/0221612 A1* 10/2006  Song et al. .................. 362/247

* cited by examiner

*Primary Examiner*—Frank G Font
*Assistant Examiner*—Michael P Mooney
(74) *Attorney, Agent, or Firm*—Wei Te Chung

(57) ABSTRACT

An exemplary backlight module (200) includes a light emitting unit (220). The light emitting unit includes a plurality of light sources (227, 228, 229) configured for providing color light beams respectively, and a mixer (222) configured for mixing the color light beams into white color beams. The mixer includes a plurality of light guide structures (223) respectively corresponding to the light sources and a mixing body (226) connected to the light guide structures. The light guide structures are configured for guiding color light beams emitted from the light sources to the mixing body. The color light beams emitted from all the light sources being partially mixed into white light beams in the mixing body.

18 Claims, 6 Drawing Sheets

BACKLIGHT MODULE AND LIQUID CRYSTAL DISPLAY USING SAME

FIELD OF THE INVENTION

The present invention relates to backlight modules used in liquid crystal displays (LCDs), and more particularly to a backlight module having mixers for mixing color light beams and a liquid crystal display using the backlight module.

GENERAL BACKGROUND

An LCD has the advantages of portability, low power consumption, and low radiation, and has been widely used in various portable information products such as notebooks, personal digital assistants (PDAs), video cameras and the like. A typical liquid crystal display generally includes a liquid crystal panel, and a backlight module configured for providing a uniform plane light for illuminating the liquid crystal panel.

Referring to FIG. 10, a typical backlight module 100 includes a bottom tray 110, an light emitting diode (LED) array 120 disposed on the bottom tray 110, and a diffusing plate 140 disposed above the LED array 120. The diffusing plate 140 is configured for diffusing light beams from the LED array 120.

The LED array 120 includes a plurality of red, green, and blue LEDs 127, 128, 129 which are arranged sequentially and repeatedly. The red, green, and blue LEDs 127, 128, 129 are all top emission LEDs.

The red, green, and blue LEDs 127, 128, 129 emit red, green, and blue light beams respectively. The red, green, and blue light beams are mixed into white light beams when traveling in a space between the diffusing plate 140 and the LED array 120, and then the white light beams strike at the diffusing plate 140.

However, the space between the diffusing plate 140 and the LED array 120 is limited for a consideration of size and weight factors, such that the red, green, and blue light beams may not have enough mixing space. In such a case, some red, green, or blue light beams directly strike at the diffusing plate 140 without being mixed. Thus, light beams provided to a liquid crystal panel by the backlight module 100 are prone to color shift of red, green, and blue. Consequently, a color shift phenomenon occurs in a corresponding display area of the liquid crystal panel. Thus, the display quality of the liquid crystal display using the backlight module 100 is impaired.

What is needed, therefore, is a backlight module and a liquid crystal display including such backlight module that can overcome the above-described deficiencies.

SUMMARY

In one preferred embodiment, a backlight module includes a light emitting unit. The light emitting unit includes a plurality of light sources configured for providing color light beams respectively, and a mixer configured for mixing the color light beams into white color beams. The mixer includes a plurality of light guide structures respectively corresponding to the light sources and a mixing body connected to the light guide structures. The light guide structures are configured for guiding color light beams emitted from the light sources to the mixing body. The color light beams emitted from all the light sources being partially mixed into white light beams in the mixing body.

Other novel features and advantages will become more apparent from the following detailed description when taken in conjunction with the accompanying drawings.

DETAILED DESCRIPTION OF PREFERRED EMBODIMENTS

Reference will now be made to the drawings to describe preferred and exemplary embodiments of the present invention in detail.

Figure 1:
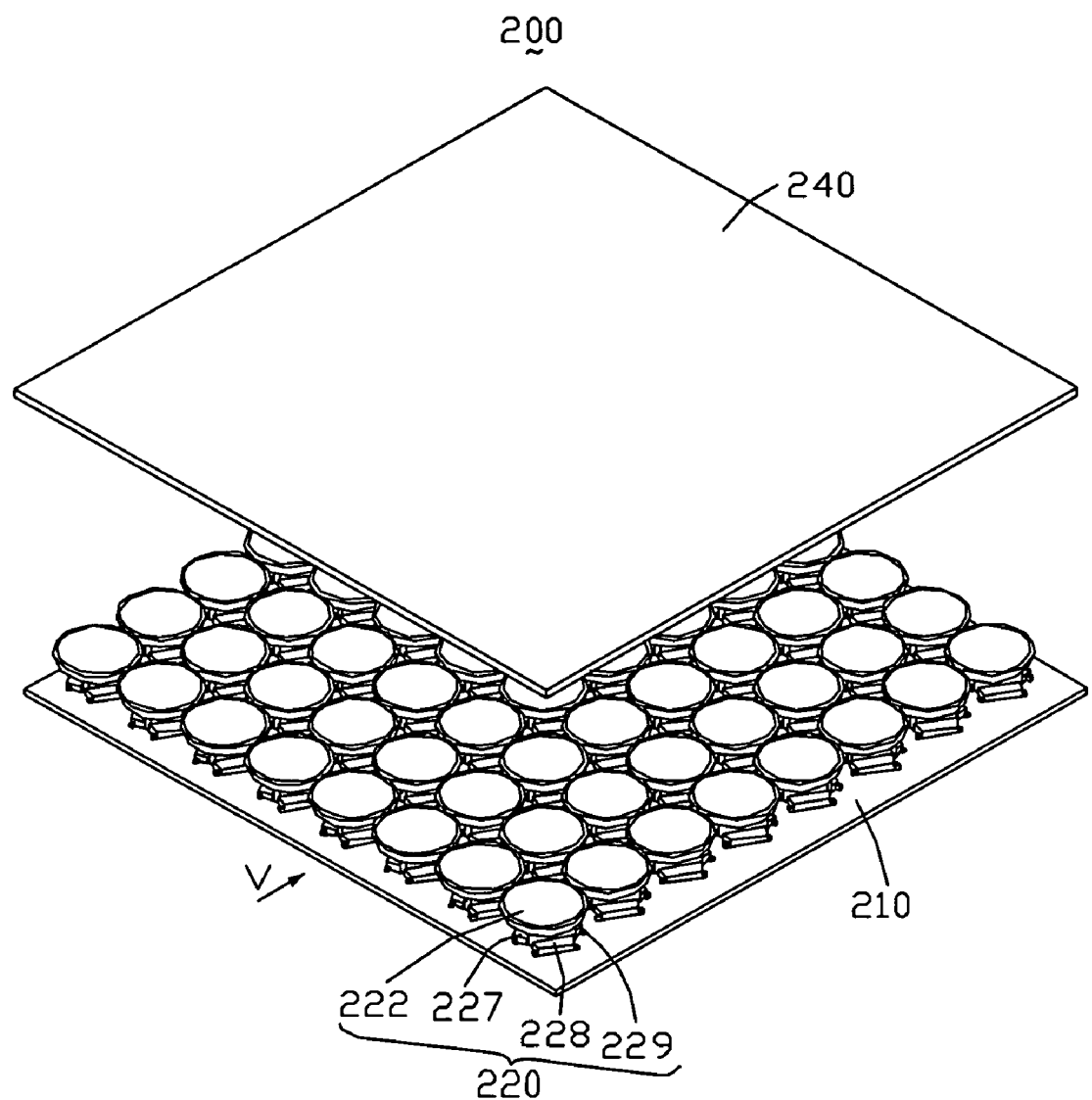
FIG. 1 is an exploded, isometric view of a backlight module according to a first embodiment of the present invention, the backlight module including a plurality of light emitting units, each light emitting unit including a plurality of red, green, and blue light emitting diodes and a mixer.

Referring to FIG. 1, an exploded, isometric view of a backlight module 200 according to a first embodiment of the present invention is shown. The backlight module 200 includes a bottom plate 210, a plurality of light emitting units 220 disposed on the bottom plate 210 and arranged in a matrix, and a diffusing plate 240 located above the light emitting units 220 and configured for diffusing light beams from the light emitting units 220. Each of the light emitting units 220 includes a red LED 227, a green LED 228, a blue LED 229, and a mixer 222. The light emitting units 220 are configured for provide mixed color light beams of red, green, and blue.

Figure 2:
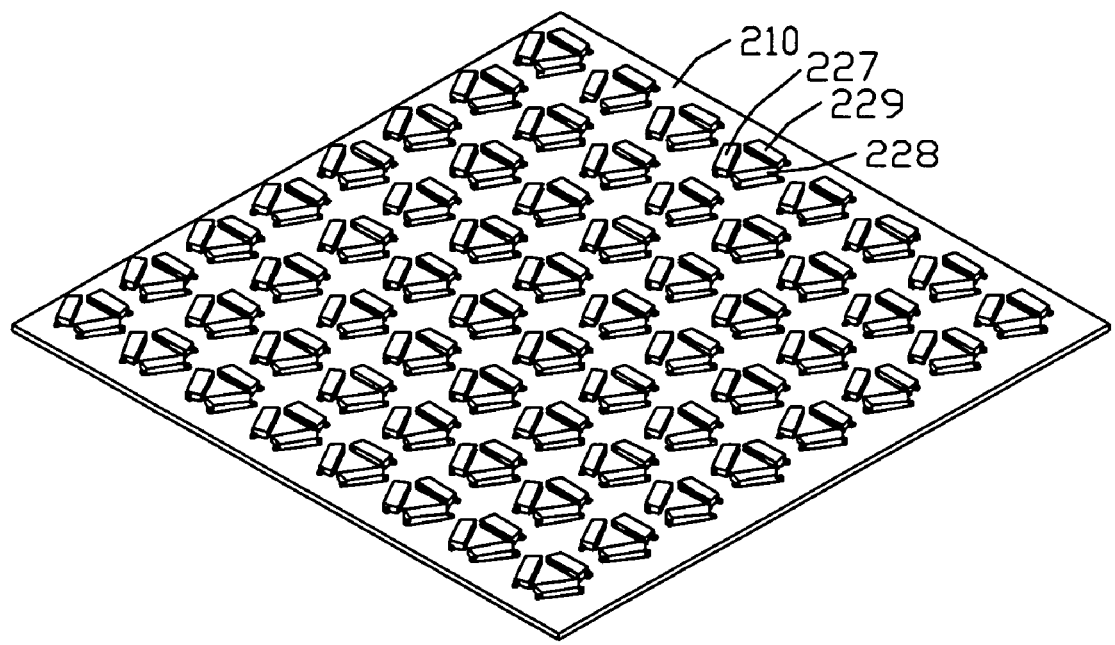
FIG. 2 is a schematic, isometric view showing an arrangement view of the red, green, and blue light emitting diodes of FIG. 1.

Referring also to FIG. 2, in each light emitting unit 220, the red LED 227, the green Led 228, and the blue LED 229 are connected end to end, thereby cooperatively defining a triangle zone. The red, green, and blue LEDs 227, 228, 229 therefore define a plurality of triangle zones arranged in a matrix correspond to the light emitting units 220 respectively.

Figure 3:
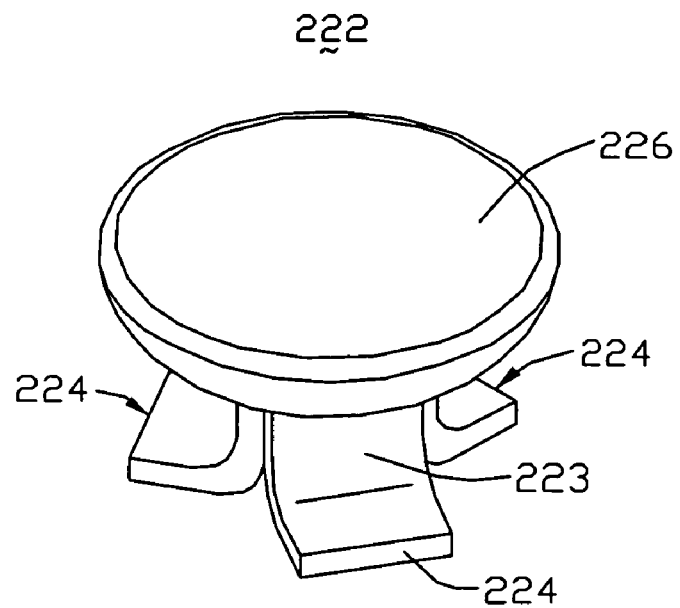
FIG. 3 is an enlarged, isometric view of the mixer of FIG. 1.

FIG. 3 is an enlarged, isometric view of the mixer 222 of one of the light emitting units 220. The mixer 222 includes three light guides 223 configured for guiding light beams and a mixing body 226 configured for mixing light beams. The light guides 223 each have a generally L-shaped vertical section. A chamfer of each of the L-shaped the light guides 223 is generally curved corner shaped. Each of the light guides 223 includes a light incident surface 224 and a light emitting surface 225 (not visible) perpendicular to the light incident surface 224. The red, green, and blue LEDs 227, 228, 229 are side emission LEDs and each have a light emitting side facing the light incident surface 224 of a corresponding light guide 223. The three light guides 223 of one mixer 222 each correspond to one of the red LED 227, the green LED 228, and the blue LED 229, respectively. The mixing body 226 is generally bowl-shaped and includes a bottom portion attached to the light emitting surfaces 225 of the three light guide structures 223 of the mixer 222. The mixing body 226 and the three corresponding light guide structure 223 cooperatively define a space therein (not visible). The mixing body 226 is essentially equivalent to a concave lens, which is capable of dispersing light beams from a narrow emitting angle to a relatively wider emitting angle.

The mixer 222 can be made from a transparent material with an index of refraction greater than an index of refraction of air, such as polycarbonate (PC) or polymethyl methacrylate (PMMA).

Figure 4:
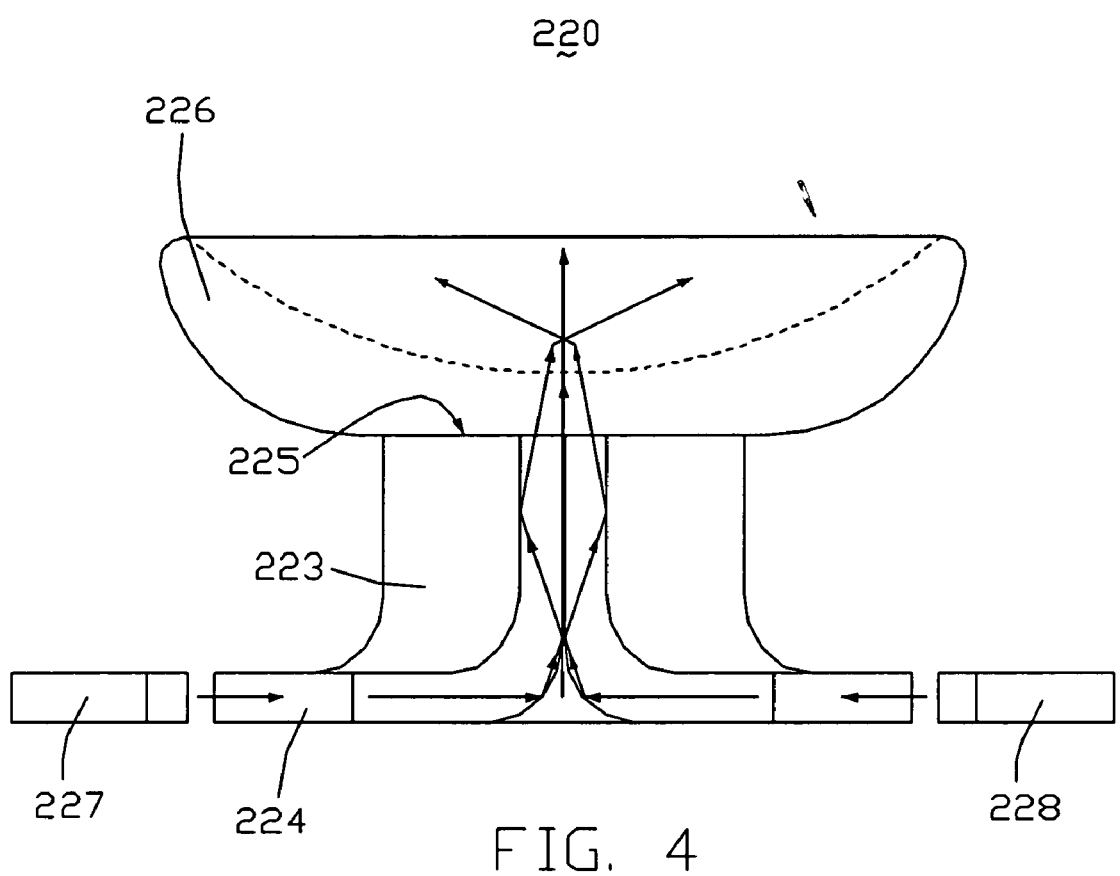
FIG. 4 is an enlarged, side-on view of the light emitting unit along a direction V of FIG. 1.

Referring also to FIG. 4, the red, green, and blue LEDs 227, 228, 229 respectively emit red, green, and blue light beams into the corresponding light guides 223 through the corresponding light incident surfaces 224. The red, green, and blue light beams are fully reflected in the light guide structures 223 before traveling into the mixing body 226 from the corresponding light emitting surfaces 225. Some of the red, green, and blue light beams are mixed into white light beams in the mixing body 226 and then travel to the diffusing plate 240. Other red, green, and blue light beams traveling directly out of the mixing body 226 are dispersed and mixed in a bowl-shaped space defined by the mixing body 226b. Therefore, the red, green, and blue light beams can be fully mixed into white light beams in the mixer 222. The backlight module 200 need not increase a distance between the bottom plate 210 and the diffusing plate 240 for a full mixture of the three-color light beams to be achieved. In addition, comparing to conventional top-light emitting LEDs, the red, green, and blue LEDs 227, 228, 229 are side emission LEDs (emitting light beams from a side) and therefore a desired distance for fully mixing the red, green, and blue color light beams into white light beams can be shortened.

Figure 5:
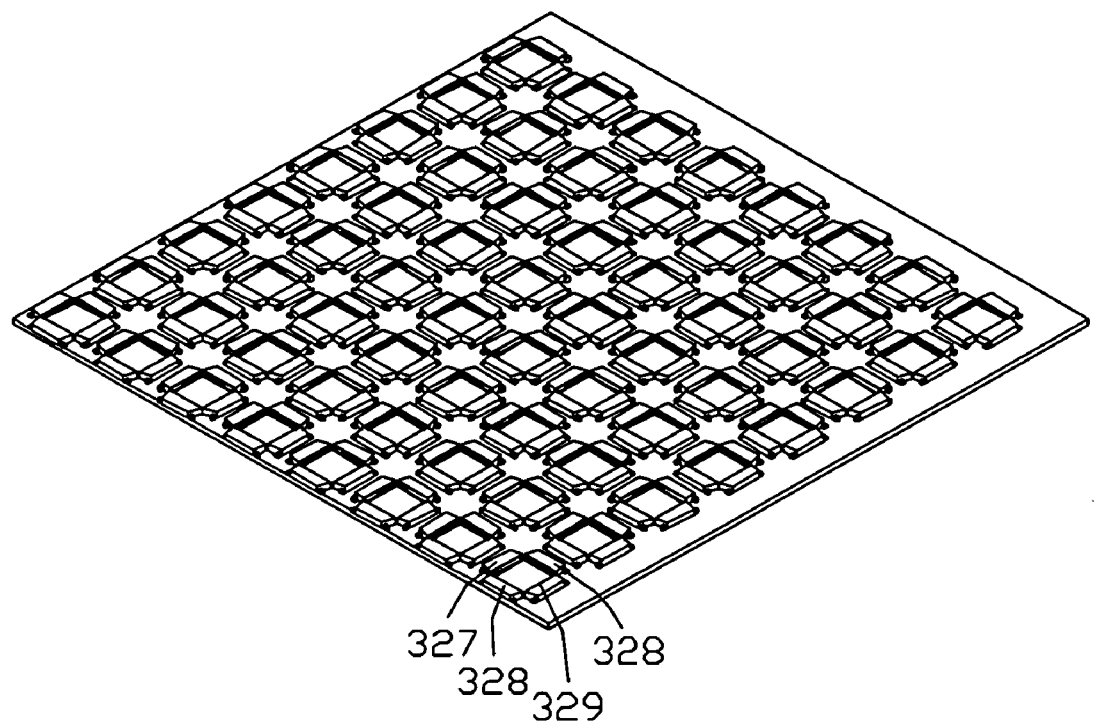
FIG. 5 is similar to FIG. 2, but showing a corresponding view in the case of an arrangement view of red, green, and blue light emitting diodes of a backlight module according to a second embodiment of the present invention.
Figure 6:
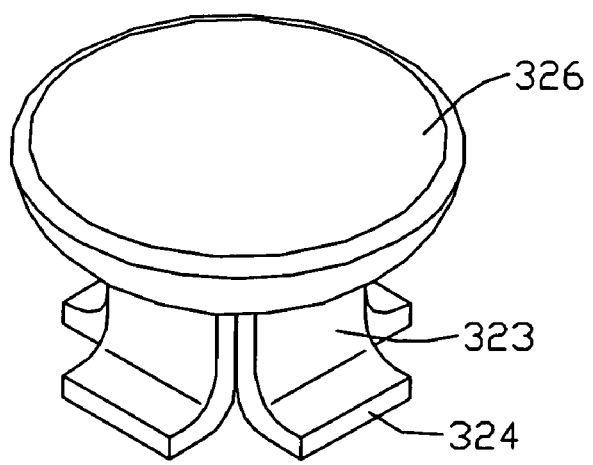
FIG. 6 is similar to FIG. 3, but showing a corresponding view in the case of one mixer of the backlight module of the second embodiment.

Referring to FIG. 5 and FIG. 6, FIG. 5 shows an arrangement of red, green, and blue LEDs 327, 328, 329 of a backlight module according to a second embodiment of the present invention, FIG. 6 shows one of mixers 322 of the backlight module. One red LED 327, two green LEDs 328, and one blue LED 329 are connected end to end, thereby cooperatively defining a square zone. The two green LED 328 are opposite to each other, and the red LED 327 and the blue LED 329 are opposite to each other.

The mixer 322 includes a mixing body 326 and four light guide structures 323 respectively corresponding to the red LED 327, the two green LEDs 328, and the blue LED 329. The four light guide structures 323 are arranged within the square zone defined by the red, green, and blue LEDs 327, 328, 329. Each of the four light guide structures 323 includes a light incident surface 324 and a light emitting surface (not visible). The mixing body 326 generally has a bowl shape. A bottom portion of the mixing body 326 is attached on the light emitting surfaces of the red, green, and blue LEDs 327, 328, 329.

Figure 7:
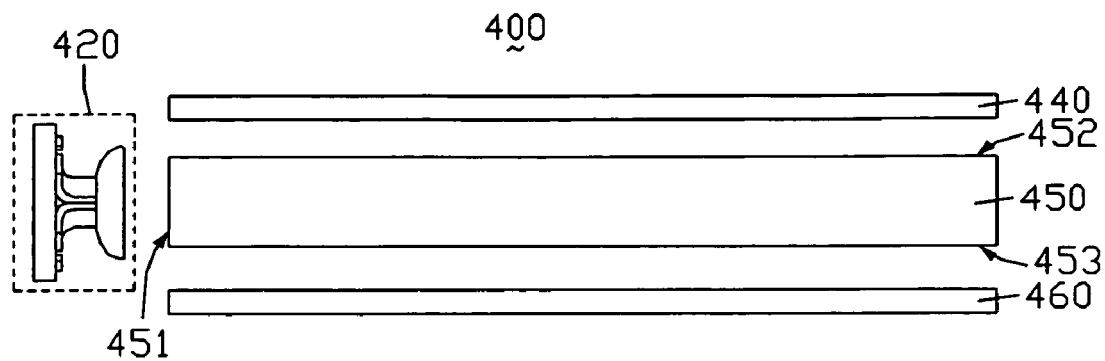
FIG. 7 is an exploded, side-on view of a backlight module according to a third embodiment of the present invention, the backlight module including a light source.

Referring to FIG. 7, a backlight module 400 according to a third embodiment of the present invention is shown. The backlight module 400 includes a light source 420, a diffusing plate 440, a light guide plate 450, and a reflecting plate 460. The light guide plate 450 includes an emitting surface 452 facing the diffusing plate 440, an incident surface 451 perpendicularly adjoining the emitting surface 452, and a bottom surface 453 opposite to the emitting surface 452. The diffusing plate 440, the light guide plate 450, and the reflecting plate 460 are arranged in that order from top to bottom. The light source 420 is disposed adjacent to the incident surface 451 of the light guide plate 450.

Figure 8:
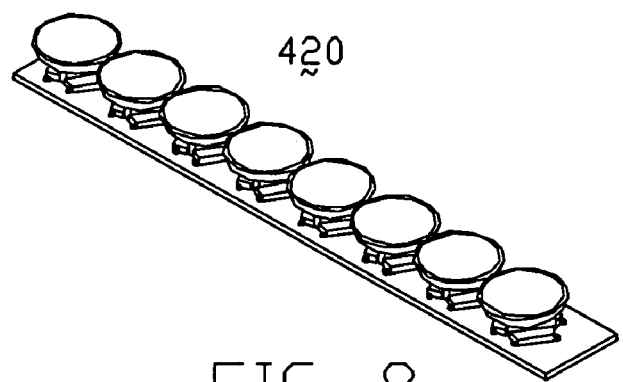
FIG. 8 is an exploded, side-on view of the light source of FIG. 7.

Referring also to FIG. 8, the light source 420 includes a plurality of light emitting units (not labeled) arranged in a line to form a light source bar. The light emitting units have similar structures to the light emitting units 220 of the first embodiment.

Figure 9:
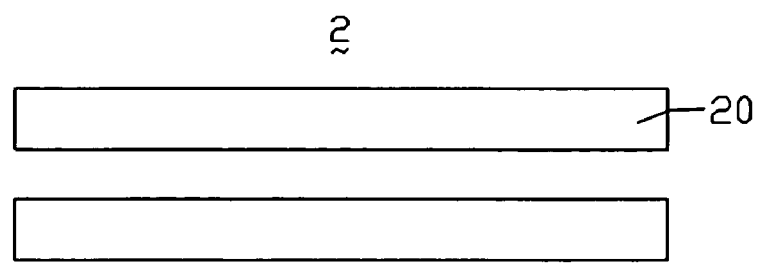
FIG. 9 is an exploded, side-on side view of a liquid crystal display according to an exemplary embodiment of the present invention.
Figure 10:
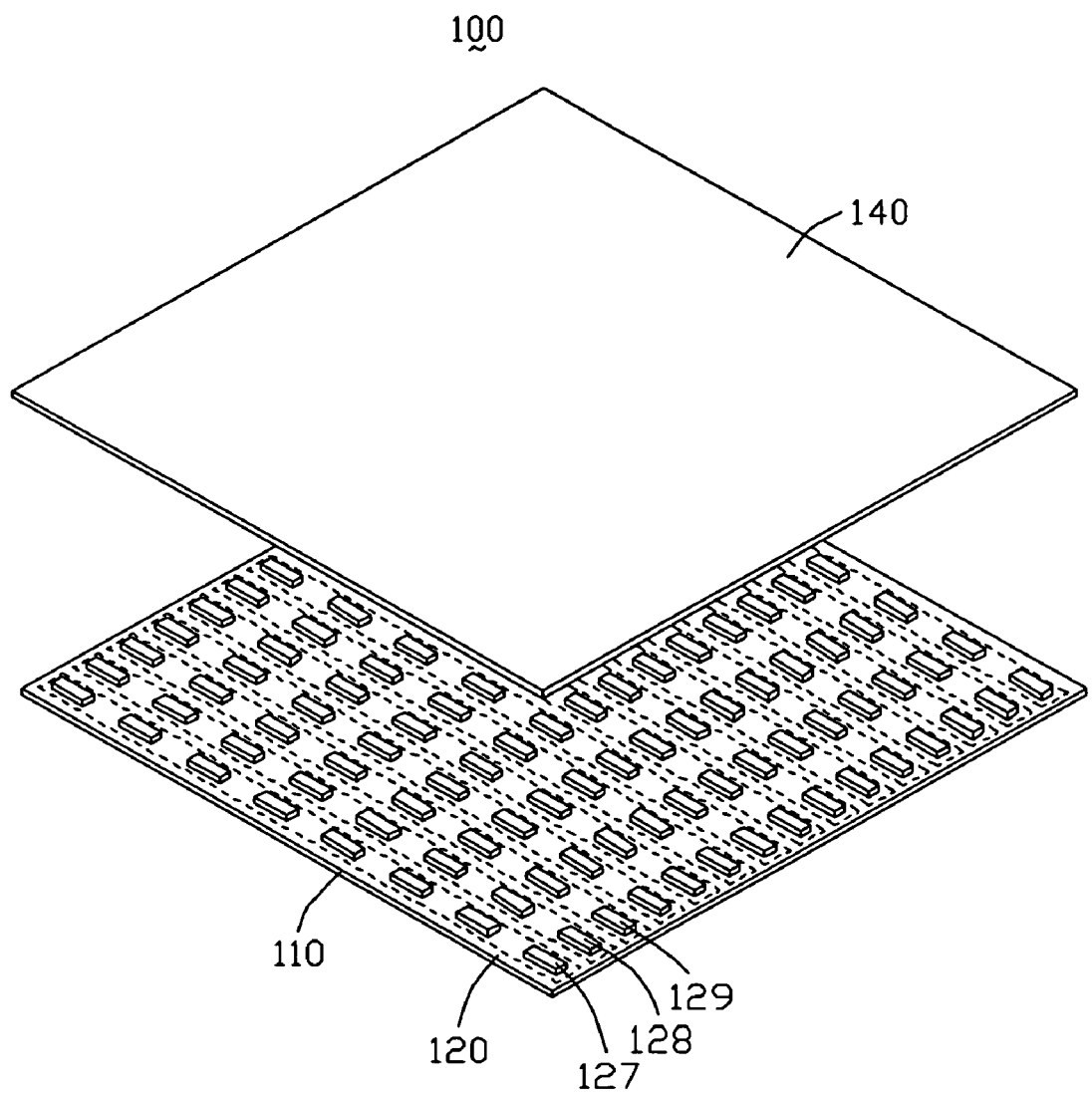
FIG. 10 is an exploded, isometric view of a conventional backlight module.

Referring to FIG. 9, a liquid crystal display 2 according to an exemplary embodiment of the present invention is shown. The liquid crystal display 2 includes a liquid crystal panel 20 and a backlight module (not labeled) adjacent to the liquid crystal panel 20. The backlight module can be any one of the backlight modules of the above-described embodiments.

It is to be understood, however, that even though numerous characteristics and advantages of preferred embodiments have been set out in the foregoing description, together with details of the structures and functions of the embodiments, the disclosure is illustrative only; and that changes may be made in detail, especially in matters of shape, size, and arrangement of parts within the principles of the present invention to the full extent indicated by the broad general meaning of the terms in which the appended claims are expressed.

What is claimed is:

1. A backlight module comprising:
    a light emitting unit comprising:
    a plurality of light sources configured for providing color light beams; and
    a mixer configured for mixing the color light beams into white color beams, the mixer comprising a plurality of light guide members respectively corresponding to the light sources, and a mixing body connected to the light guide member, the light guide members being configured for guiding color light beams emitted from the light sources to the fluxing body, the mixing body defining a bowl shaped space;
    wherein the color light beams emitted from the light sources are mixed into white light beams partially in the mixing body and partially in the bowl shaped space defined by the mixing body.

2. The backlight module in claim 1, wherein each of the light guide members comprises a light incident surface adjacent to the corresponding light source and a light emitting surface attached to the mixing body.

3. The backlight module in claim 2, wherein the light sources are side emission light emitting diodes.

4. The backlight module in claim 3, wherein the light emitting diodes comprise red light emitting diodes, green light emitting diodes, and blue light emitting diodes.

5. The backlight module in claim 4 wherein the mixer comprises three light guide members corresponding to one red light emitting diode, one green light emitting diode, and one blue light emitting diode respectively, the red, green, and blue light emitting diodes connected end to end and defining a triangle zone, the corresponding light guide members being disposed within the triangle zone.

6. The backlight module in claim 4, wherein the mixer comprises four light guide members corresponding to one red light emitting diode, two green light emitting diodes, and one blue light emitting diode respectively, the red, green, and blue light emitting diodes connected end to end defining a square zone, the two green light emitting diodes being opposite to each other, the corresponding light guide members being disposed within the square zone.

7. The backlight module in claim 2, wherein the light guide member has an L-shaped vertical section, and a corner of the L-shape of the vertical section is curved.

8. The backlight module in claim 2, wherein each of the mixing bodies is in a form of a bowl shape, a bottom portion of the mixing body being attached to the light emitting surfaces of the light guide members.

9. The backlight module in claim 1, further comprising a diffusing plate and a bottom plate, the light emitting unit being disposed on the bottom plate, the diffusing plate being disposed above the bottom plate.

10. The backlight module in claim 9, further comprising a plurality of light emitting units, the light emitting units arranged in a matrix on the bottom plate.

11. The backlight module in claim 1, further comprising a diffusing plate, a light guide plate, and a reflecting plate arranged sequentially, the light guide plate comprising an emitting surface facing toward the diffusing plate, an incident surface perpendicularly adjoining the emitting surface, and a bottom surface adjoining the incident surface and facing the reflecting plate, the light emitting unit being adjacent to the incident surface of the light guide plate.

12. The backlight module in claim 1, wherein the mixer is made from transparent material that has an index of refraction greater than an index of refraction of air.

13. The backlight module in claim 12, wherein the transparent material is polycarbonate or polymethyl methacrylate.

14. A liquid crystal display comprising:
a liquid crystal panel; and
a backlight module configured for providing light beams for the liquid crystal panel, the backlight module being adjacent to the liquid crystal panel, the backlight module comprising:
a diffusing plate;
a plurality of light emitting units adjacent to the diffusing plate, each of the light emitting units comprising a plurality of illuminators and a mixer, the illuminators being configured for providing light beams of various colors, the mixer being configured for mixing the light beams of various colors into white light beams and providing the white light beams to the diffusing plate, the mixer comprising a plurality of light guide members corresponding to the illuminators of the same light emitting unit and a mixing body, each light guide member having an L-shaped vertical section, a corner of the L-shape of the vertical section being curve shaped, each light guide member comprising a light incident surface adjacent to a side of the illuminator that emits light beams and a light emitting surface being attached with the light incident surface.

15. The liquid crystal display in claim 14, further comprising a bottom plate, the light emitting units arranged in a matrix on the bottom plate.

16. The liquid crystal display in claim 14, wherein each of the illuminators is a light emitting diode that emits light beams of red, or green, or blue.

17. The liquid crystal display in claim 16, wherein the light emitting diode emits light beams from a side thereof.

18. The liquid crystal display in claim 14, wherein each light emitting unit comprises three illuminators emitting red, green, and blue light beams respectively.

* * * * *